Aug. 30, 1927.

M. G. KOTLER 1,640,840

THEFT PREVENTING BOLT

Filed Feb. 16, 1925

Inventor
Moses G. Kotler
by Jas. H. Churchill
his Atty.

Patented Aug. 30, 1927.

1,640,840

UNITED STATES PATENT OFFICE.

MOSES G. KOTLER, OF BOSTON, MASSACHUSETTS.

THEFT-PREVENTING BOLT.

Application filed February 16, 1925. Serial No. 9,479.

This invention relates to a theft preventing bolt and has for its object to provide a novel device of this character, which among other uses is particularly adapted for use in preventing the theft of automobile tires and rims when mounted upon the wheels of a motor vehicle or when carried as a spare rim and tire upon the usual tire carrier at the rear of the vehicle.

To this end the theft-preventing device comprises a threaded bolt having a keyway, a key movable in said keyway, a nut on the threaded bolt which is held from rotation by said key, and a locking member carried by said bolt and co-operating with said key to lock the latter against unauthorized removal from said bolt.

In the preferred construction, the bolt is provided with a hollow head into which the key is extended and in which the locking mechanism for said key is also extended to co-operate with the key within the head of the bolt.

These and other features of the invention will be hereinafter described and particularly defined in the claims at the end of this specification.

Figure 1:
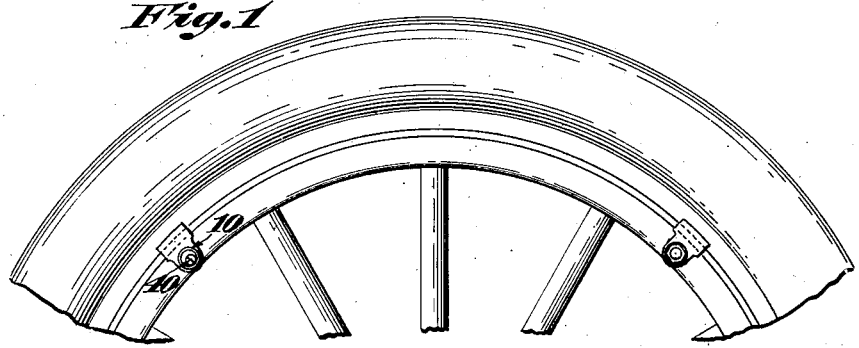
Figure 2:
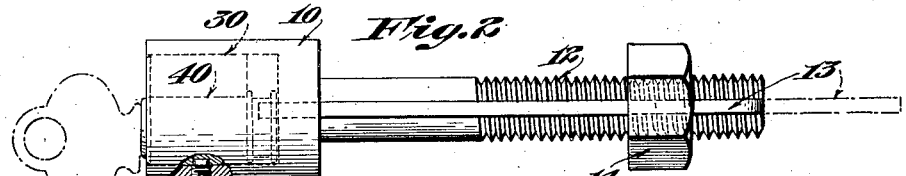
Figure 3:
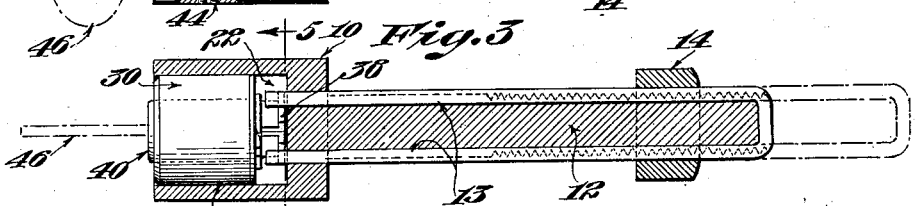
Figures 4, 5, 6, 7:
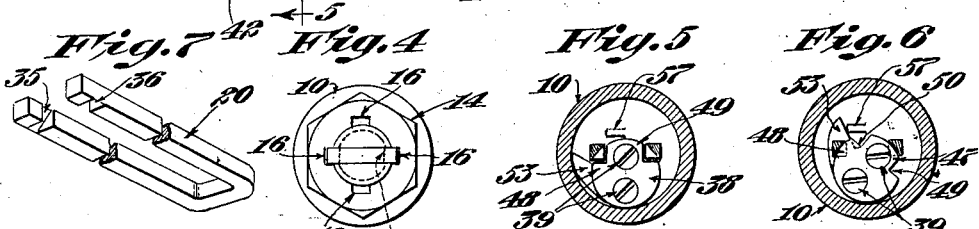
Figure 8:
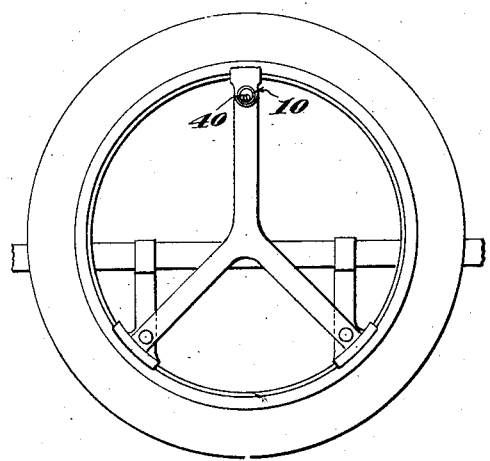
Figure 9:
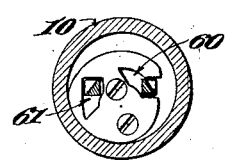
Figure 10:
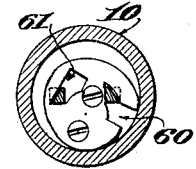

In the drawings illustrating the preferred embodiment of the invention, Figure 1 illustrates in side elevation a portion of a motor vehicle wheel in which the tire and rim are locked by means of the present device; Fig. 2 is a side elevation of the preferred form of the device itself; Fig. 3 is a vertical longitudinal section of the same; Fig. 4 is an end elevation viewed from the right of Fig. 2; Fig. 5 is a section on line 5—5 of Fig. 3 viewed in the direction of the arrow and showing the locking mechanism within the bolt head in its inoperative position; Fig. 6 is a similar view of Fig. 5, showing the locking mechanism in its operative locking position; Fig. 7 is a perspective detail of the key member for locking the nut upon the threaded bolt; Fig. 8 is a side elevation showing a spare tire and rim locked by means of the present device upon the usual form of spare tire carrier; Figs. 9 and 10 are details in section similar to Figs. 5 and 6 showing an alternative form of locking mechanism.

Referring to the drawing the improved theft preventing device comprises a bolt provided with a head 10 and a shank 12 having a threaded outer end portion. The threaded shank 12 is provided with one or more keyways 13 and preferably with a pair of opposed keyways extended longitudinally of the shank. A nut 14 is removably screwed upon the threaded shank 12 and is provided with keyways 16 adapted to cooperate with the keyways 13 in the shank 12, to permit a nut retaining key, herein shown as of U-shape and comprising two key members connected at their outer ends. The key members are slidably received within the alined keyways, and prevent rotation of the nut with relation to the bolt.

Provision is made for locking the nut retaining key 20 within the keyways 13, 16 and in fixed relation to the bolt to thereby prevent the nut from being unintentionally unscrewed from the bolt, and for this purpose, as herein shown, the head 10 of the bolt is hollowed out or provided with a socket or bore 22, and the ends of the nut retaining key 20, when the latter occupies its operative position, are arranged to extend through openings in the head of the bolt and into the socket 22 in the manner illustrated in Fig. 3. A locking mechanism indicated by the general reference character 30 is provided within the head of the bolt and is arranged to co-operate with the ends of the key 20 to lock the same and prevent the key from being withdrawn from its operative position. As herein shown, the ends of the key 20 are provided with slots 35, 36 with which cooperates a locking member 38 secured by screws 39 to the end of the rotatable member or operating shaft 40 of the standard key operated locking mechanism 30. In the present instance the standard locking mechanism 30 is enclosed within a metal cylinder 42 of a size adapted to fit into and close the open end of the bore 22. The metal cylinder 42 is normally held from rotation within the bore 22 by a set screw 44, the end of which is adapted to be received within a hole in the surface of the metal cylinder 42, see Fig. 2. The locking mechanism within the metal cylinder 42 is adapted to be operated by the control key 46, and upon rotation of said key into locking position, the locking member 38 is rotated from the position illustrated in Fig. 5 to that illustrated in Fig. 6 in which the portions 47, 48 of the locking member are caused to enter the slots 35, 36 in the ends of the nut retaining key 20 and to thereby lock the same and to prevent the key 20 from being withdrawn from its operative position. When the control key 46 is rotated in a reverse direction into its unlocked position, the locking member 38 is again returned to the position shown in Fig. 5, in which the ends of the key 20 are alined with notched out portions 49, 50 in the locking member 38, so that the operator may withdraw the nut retaining key 20 from its keyway as indicated in Figs. 2 and 3. When the key 20 is completely removed from its keyway, the nut 14 may be unscrewed from the shank of the bolt.

In order to facilitate the withdrawing of the control key 46 from its keyhole, a stop member comprising a crank or arm 54 is mounted on the operating shaft 40 to turn therewith and is located under the locking member 38. The arm 54 is arranged to engage an abutment 57 projecting from the face of the metal cylinder 42, as illustrated in Figs. 5 and 6. When the arm 54 engages the abutment member 57, stopping further rotation of the locking mechanism, the position of the parts of the locking mechanism are alined to permit the control key 46 to be readily withdrawn from its keyhole. In this manner the accurate alinement of the parts of the locking mechanism is insured, as is the withdrawal of the control key 46 at all times when the key is rotated into a position to lock the nut retaining key. The nut retaining key is preferably constructed of U-shape and arranged to extend over the end of the shank of the bolt, and with this construction, it will be observed that when the nut retaining key 20 is locked in its operative position by the control member 38 as represented in Fig. 6, the metal cylinder 42 within which the locking mechanism is contained, is also locked from being withdrawn from the bore 22 in the head of the bolt entirely independently of the presence or absence of the set screw 44. The set screw 44, however, functions to aline the metal cylinder 42 in a proper position so as to permit the ends of the nut retaining key 20 to be readily inserted through the notched out portions 49, 50 of the locking member 38 when the locking member is in its unlocked position, such as illustrated in Fig. 5.

In the modification illustrated in Figs. 9 and 10, the locking member 38 is provided with slots 60, 61 of a particular shape and which are arranged to permit movement of the locking member 38 into a locking position, shown in Fig. 10, and also arranged so as to permit the locking member 38 to cooperate with slots 35 and 36 formed in the end portions of the nut retaining key 20 to lock the latter from being withdrawn. When the locking member is constructed of the form illustrated in Figs. 9 and 10, the slots 35, 36 may be formed in the outer portions rather than in the inner portions of the ends of the nut retaining key 20, simplifying the manufacture of the key because of the ease of milling the slots in the outer portions rather than in the inner portions as required in the construction illustrated in Figs. 5 and 6. By reference to Figs. 9 and 10, it will be observed that in the unlocked position of the modified form of locking member 38, the ends of the nut retaining key 20 may be readily inserted through the enlarged portions of the slots 60, 61, and that when the locking member 38 is rotated into its locking position illustrated in Fig. 10, the ends of the key are received within the narrow end portions of the slots, providing an efficient lock and preventing withdrawal of the key.

From the description thus far, it will be observed that the present theft preventing device may be used for all the purposes for which an ordinary bolt and nut is used, and that it is particularly adapted for use in place of the ordinary bolts and nuts with the lugs for holding the rims and tires upon motor vehicle wheels or upon the usual spare tire carrier at the rear of the vehicle. The improved device is simple in construction and may be easily operated.

While it may be preferred to use a nut-retaining key member composed of two members, it is not desired to limit the invention in this respect.

I claim—

1. The combination with a threaded bolt provided with a keyway longitudinally of the bolt in the threaded portion thereof, of a key movable in the keyway longitudinally of the bolt, a nut on the threaded bolt held from rotation by said key, and a key-operated locking member cooperating with the nut-locking key to prevent removal thereof from said keyway.

2. The combination with a bolt provided with a head and with a threaded shank having a keyway, of a key movable in the keyway, a nut on the bolt held from rotation by the key, and a locking mechanism cooperating with the key and located within the head of the bolt.

3. The combination with a bolt provided with a hollow head and with a threaded shank having a keyway, of a key movable in the keyway into the hollow head, a nut provided with a keyway arranged to be locked from rotation by the key, and a locking member cooperating with the key within the hollow head to lock the key against removal.

4. The combination with a threaded bolt provided with a bore in the head thereof, of locking mechanism fitting into and closing the outer end of the bore and provided with a rotatable shaft, a nut on the threaded bolt, a key for preventing rotation of the nut upon the threaded bolt, and connections between the said key and the rotatable shaft of the locking mechanism for locking the key in its operative position.

5. The combination with a threaded bolt provided with a keyway, of a key movable in the keyway, a nut on the threaded bolt held from rotation by said key, a locking member within the head of the bolt and adapted to be operated by a control key, and means cooperating with the locking member for locking the nut retaining key in its operative locking position.

6. The combination with a threaded bolt having a hollow head, of a locking mechanism within the bolt and forming a closure for the hollow head, a nut on the threaded portion of the bolt, a U-shaped key for locking the nut from rotation upon the threaded portion of the bolt and having the ends thereof extended into the hollow head of the bolt, and connections between the locking mechanism and said ends of the key for preventing the key from being unintentionally withdrawn from its operative locking position.

7. The combination with a threaded bolt provided with a hollow head, of a nut on the threaded bolt, keyways in the threaded portion of the bolt and in the nut, a key movable in the keyways and having the end thereof extended into the hollow head of the bolt, a slot in the extended end of the key, and a locking member adapted to be moved into said slot to lock the key in its operative position.

In testimony whereof, I have signed my name to this specification.

MOSES G. KOTLER.